US007887067B2

(12) United States Patent
Sandvik et al.

(10) Patent No.: US 7,887,067 B2
(45) Date of Patent: *Feb. 15, 2011

(54) CHILD SAFETY DEVICE FOR CHILD SEAT

(75) Inventors: Dag Harald Sandvik, Finnsnes (NO); Arve Cruickshank, Finnsnes (NO)

(73) Assignee: Fall Stop Holding AS, Finnsnes (NO)

( * ) Notice: Subject to any disclaimer, the term of this patent is extended or adjusted under 35 U.S.C. 154(b) by 0 days.

This patent is subject to a terminal disclaimer.

(21) Appl. No.: 11/017,418

(22) Filed: Dec. 20, 2004

(65) Prior Publication Data
US 2005/0156394 A1 Jul. 21, 2005

Related U.S. Application Data

(63) Continuation-in-part of application No. 10/089,306, filed on May 13, 2002, now Pat. No. 6,832,767.

(51) Int. Cl.
B62D 39/00 (2006.01)

(52) U.S. Cl. .............................. 280/33.992; 280/33.991; 280/33.993; 280/DIG. 4; 297/256.15; 297/256.17

(58) Field of Classification Search ............ 297/256.15, 297/256.17, 464, 466, 487, 488; 280/DIG. 3, 280/4, 33.991–33.993, DIG. 4
See application file for complete search history.

(56) References Cited

U.S. PATENT DOCUMENTS

| 821,388 | A | * | 5/1906 | Unger | 297/154 |
| 1,025,953 | A | * | 5/1912 | Hallen | 297/487 |
| 1,253,241 | A | * | 1/1918 | Haussinger | 297/112 |
| 1,259,604 | A | | 3/1918 | Cook | |
| 1,407,408 | A | * | 2/1922 | Gray | 297/254 |
| 1,486,813 | A | * | 3/1924 | Tallman | 297/150 |
| 2,084,448 | A | * | 6/1937 | Merchant | 297/150 |
| 2,592,879 | A | * | 4/1952 | Eyerly | 297/487 |
| 2,664,150 | A | * | 12/1953 | Byrne | 297/466 |
| 2,755,101 | A | * | 7/1956 | Budde | 280/748 |
| 2,860,886 | A | | 11/1958 | Schweitzer | |
| 3,185,521 | A | * | 5/1965 | Waldo | 297/153 |
| 3,409,326 | A | * | 11/1968 | Kerner | 280/753 |
| 3,845,892 | A | * | 11/1974 | Bernhardt, Jr. | 224/415 |
| 4,280,731 | A | | 7/1981 | Pitts et al. | 297/487 |

(Continued)

FOREIGN PATENT DOCUMENTS

GB 2282572 4/1995

Primary Examiner—Christopher P. Ellis
Assistant Examiner—Vaughn T Coolman
(74) Attorney, Agent, or Firm—Weingarten, Schurgin, Gagnebin & Lebovici LLP

(57) ABSTRACT

A safety device in connection with a child seat in a shopping cart. The safety device prevents a child, placed on the seat from being able to pull its legs out of the openings formed through the end wall of the shopping cart. The child seat is pivotally suspended from the end wall, which can preferably be swung inwards/upwards in the shopping cart about a horizontal axis, when shopping carts are being stack horizontally. The child seat is placed adjacent to the through opening for the child's legs. Adjacent the openings for the child's legs through the end wall there is arranged an adjustable safety element that can restrict the openings when activated, after the child's legs have been put through the openings.

25 Claims, 15 Drawing Sheets

U.S. PATENT DOCUMENTS

| | | | |
|---|---|---|---|
| 4,403,807 A | 9/1983 | Wilkinson et al. | 297/217 |
| 4,819,988 A | 4/1989 | Hellstrom | 297/467 |
| 4,867,464 A | 9/1989 | Cook | |
| 5,011,169 A * | 4/1991 | Henderson et al. | 280/202 |
| 5,086,960 A | 2/1992 | Schwietzer | |
| 5,129,478 A * | 7/1992 | Suenaga et al. | 180/268 |
| 5,203,612 A | 4/1993 | Pokrzywinski | 297/466 |
| 5,203,613 A | 4/1993 | Ward | 297/485 |
| 5,207,481 A * | 5/1993 | Ayala et al. | 297/464 |
| 5,334,099 A * | 8/1994 | Marra et al. | 472/118 |
| 5,533,786 A * | 7/1996 | Cone, II | 297/256.15 |
| 5,547,250 A | 8/1996 | Childers | 297/256 |
| 5,636,818 A | 6/1997 | Edwards et al. | |
| 5,651,557 A * | 7/1997 | De Stefano | 280/33.993 |
| 6,089,653 A * | 7/2000 | Hotaling et al. | 297/130 |
| 6,513,441 B1 * | 2/2003 | Clerx et al. | 104/53 |
| 6,595,590 B2 * | 7/2003 | Bottoms | 297/423.11 |

\* cited by examiner

CHILD SAFETY DEVICE FOR CHILD SEAT

CROSS REFERENCE TO RELATED APPLICATIONS

The present invention is a continuation-in-part of U.S. patent application Ser. No. 10/089,306, filed May 13, 2002 now U.S. Pat. No. 6,832,767, entitled Device for Child Seat in a Shopper Trolley.

STATEMENT REGARDING FEDERALLY SPONSORED RESEARCH OR DEVELOPMENT

N/A

BACKGROUND OF THE INVENTION

This invention relates to a device for the child seat in a shopping cart, where the child seat is pivotally supported in the area of the handle bar of the cart, so that the openings through the adjacent end piece form passages for the child's legs when the child seat has been pivoted into the cart, into an approximately horizontal position, the shopping cart preferably being of the type, which can be inserted partially into other shopping carts through an end wall, which can be swung up, to allow stacking in the horizontal direction.

Child seats of the kind in question are not safe, since, by turning itself, the child can easily bring one foot up on the seat, from where it is easy to get up into a standing position, or the child can remain lying on its knees on the seat. Such situations may easily result in the child falling to the floor. Fatal accidents and serious accidents resulting in permanent injuries have happened, caused by falls from the child seat of the shopping cart.

The passages through the end piece of the shopping cart nearest to the push handle bar/cross-bar cannot be restricted as such, because this would make it difficult, possibly impossible, to place a child's legs through the openings. Therefore, these permanent passages should be wide and spacious insertion openings, which the child's legs can easily be put through and pulled out of later.

BRIEF SUMMARY OF THE INVENTION

According to the present invention there has therefore been provided a safety device in the form of a transversal body adjustable heightways, which is lowered, when the child's legs have been put through the passage openings of the end piece of the shopping cart, from an upper idle stand-by position to a lower active securing position, wherein the safety body restricts the passage openings for the child's legs heightways from the top. When this safety body is in one active lower securing position, this position may correspond to one of a number of different height positions depending on the thickness of the child's thighs. The safety body can thus be adjusted heightways and be fixed at the level set.

The safety element, which may have a shape resembling a clothes' hanger, which can be adjusted heightways and can be fixed at different levels, may with advantage be secured to a vertically displaceable slide, which can be fixed in different positions of height, and which may have one or more projections or similar engagement means releasably engaging at lest one rack oriented vertically, which engagement can be temporarily released when the slide with the safety element is moved upwards or downwards for the purpose of height adjustment. The slide with the safety element and the projection/projections/engagement means are preferably biased towards a position in order to establish and maintain the engagement of the rack(s) in the height position set, preferably by means of a helical spring inserted between the slide and a counter means, which is immovable in the cushioning directions (axial direction) of the spring, but displaceable upwards and downwards in the directions of displacement of the slide, said helical spring extending perpendicularly to the longitudinal direction of the rack(s). By subjecting the slide with the safety element to a pressure force centrally, directed opposite the back-springing direction of the helical spring, and in the axial direction of the spring, the spring is compressed and tightened, while at the same time the one or more protrusions of the slide are disengaged sideways from the respective tooth notch or notches of the rack(s), whereby at least one projection lands in a vertical guide groove.

With the projection of the slide gliding displaceably in the guide groove, the slide with the safety element may be displaced up or down, with the slide in the condition pushed in against the action of the compression spring, until the wanted height position of the safety element is reached.

The effective height position of the safety element will normally depend on the thickness of the child's thighs. When the child is to be removed from the child seat, the slide with the safety element is pressed in against the action of the compression spring, so that said projection is brought out of engagement from a rack notch of the respective rack(s) and lands in the vertical guide groove, in order for the slide with the safety element to be pushed upwards into an idle stand-by position.

According to another embodiment of the present invention, a safety element is provided that tends to restrict an opening relative to a seat, where the opening is suitable for receiving the leg of an occupant of the seat. The opening restriction may take a number of forms, including slidably adjustable frames that restrict the opening from any direction, including top, sides, and bottoms. The safety element may be composed of solid molded plastic, for example, or any other suitable material for use with a seat, including a seat in a shopping cart. For example, the safety element may be composed of a wire frame.

According to another embodiment of the present invention, a safety element is provided for restricting an opening relative to a seat, where the opening is suitable for receiving a leg of a human occupant of the seat. The safety element restricts the leg opening through any suitable means, such as, for example, by pivoting, sliding, snapping on, or any other kind of attachment mechanism that permits relative movement.

In accordance with another embodiment of the present invention, a safety element for a child seat in a shopping cart restricts the leg opening of the seat to assist in preventing the child from arriving at a dangerous position within the shopping cart seat. The safety element is suitable for all types of shopping carts, including those made of wire frame, plastic, or any other materials or designs. Preferably, the safety element is attached to the shopping cart to permit the shopping cart to be nestable without damaging the safety element. Alternately, or in addition, the safety element is removable attached to the shopping cart. In accordance with one embodiment, the safety element is slightly attached to the shopping cart to permit relative movement of the safety element with respect to the shopping cart.

Further objects, advantages and features of the invention will appear from the following description of a non-limiting example of a preferred embodiment, which is illustrated in the accompanying drawings, in which:

BRIEF DESCRIPTION OF THE SEVERAL VIEWS OF THE DRAWINGS

FIG. 5A being a cross-section along the live V-V in FIG. 5;

FIG. 6 corresponds to FIG. 5 in all essentials, but here the projections of the slide have been disengaged form the notches of the vertical racks, one of the visible projections thereby being positioned in the vertical guide groove located between the two racks forming a pair of racks, in order for the slide to be moved up or down relative to the position shown in FIG. 6;

FIG. 6A is a section along the line VI-VI in FIG. 6;

DETAILED DESCRIPTION OF THE INVENTION

Figure 1:
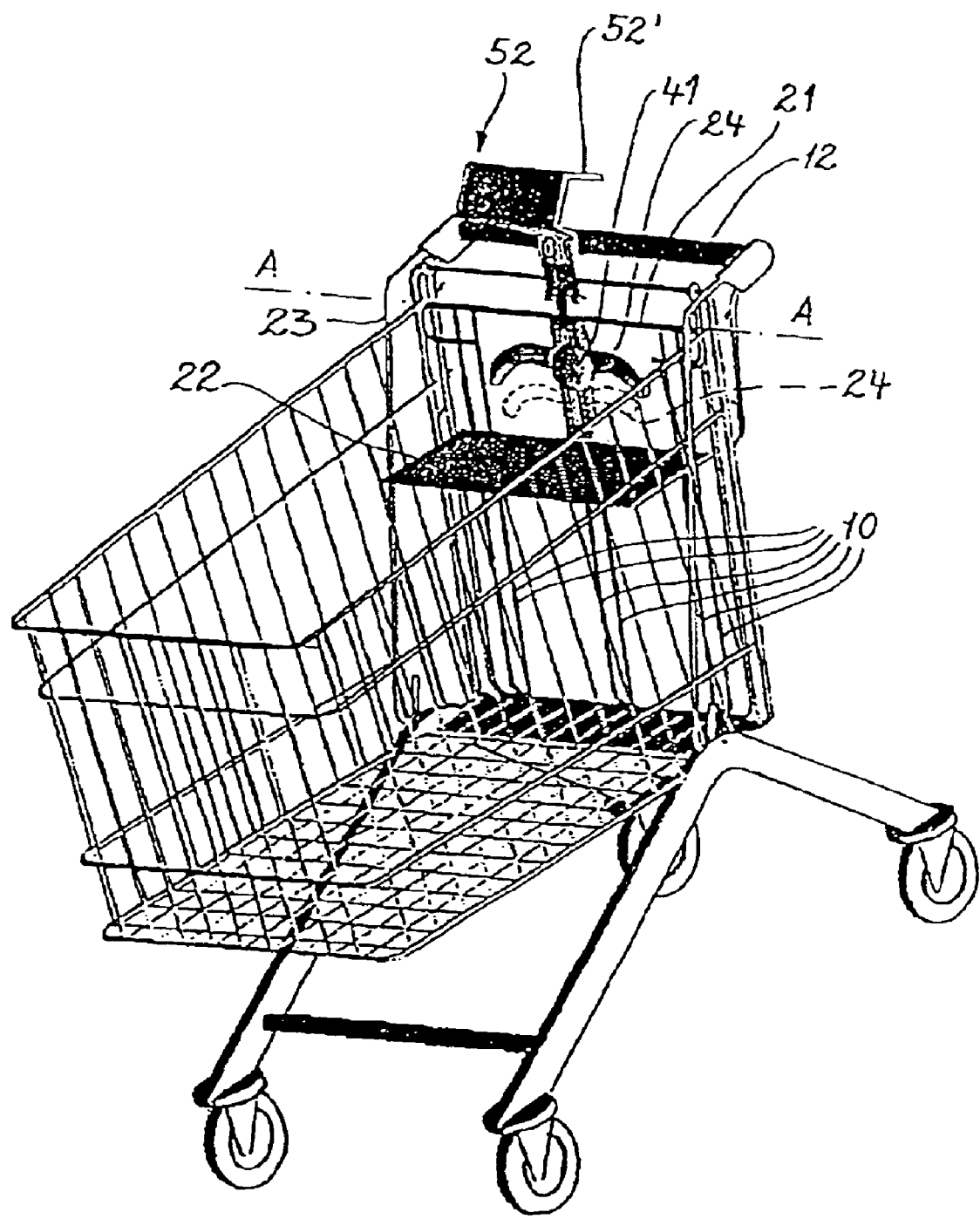
FIG. 1 shows a perspective view of a shopping cart, in which the safety bar is shown, drawn in full lines, in its upper idle stand-by position, and in dotted lines, in one lower, active position.
Figure 2:
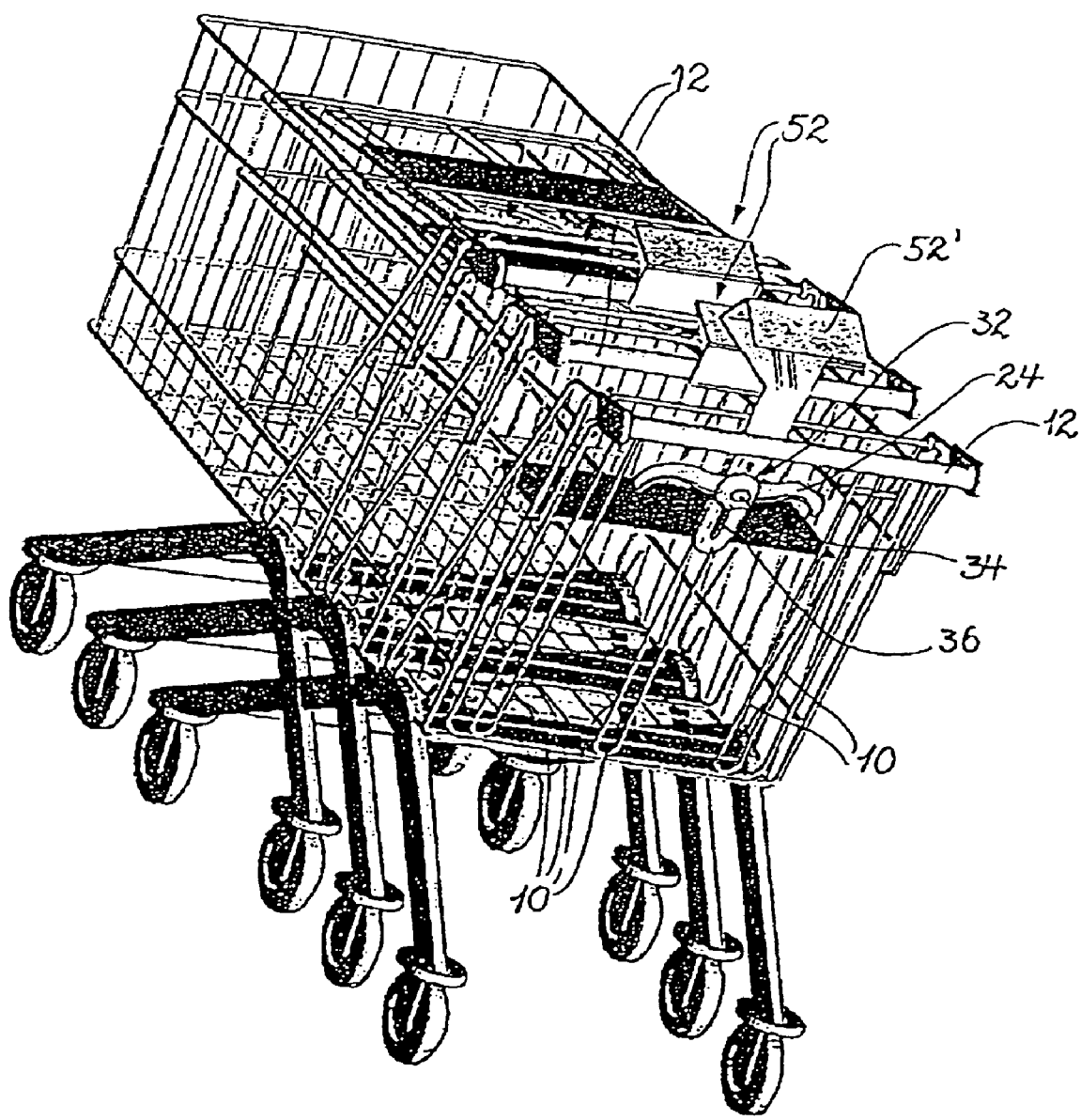
FIG. 2 shows, in perspective, three stackable shopping carts, stacked partly into one another in the horizontal direction.
Figure 3:
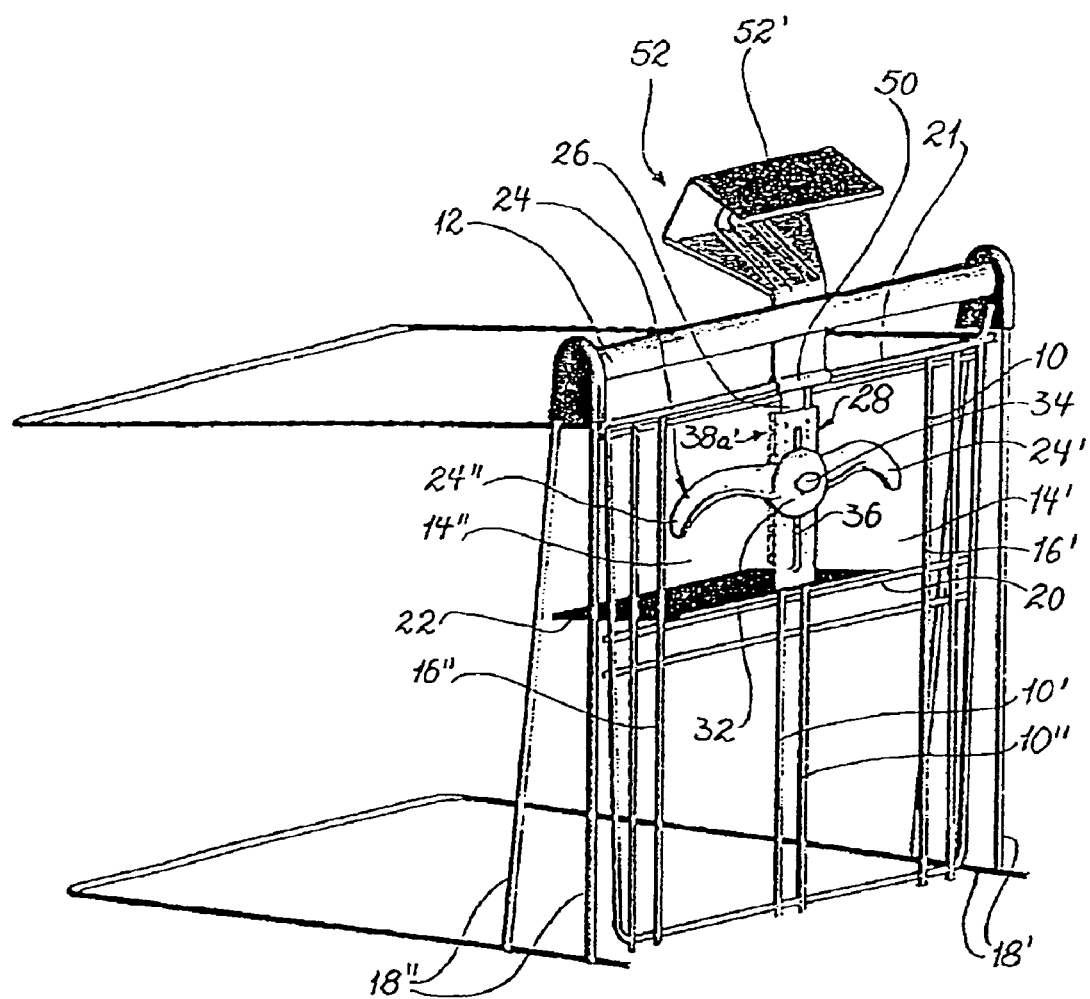
FIG. 3 shows a partial perspective view of a shopping cart, in which the "basket" of the shopping cart is highly simplified.

Reference is made to FIGS. 1-3 in which the shopping cart shown has an end wall 10 at a transversal handle bar 12. As appears more clearly from FIG. 3, the end wall 10 comprises two middle elements 10', 10", essentially vertical, rod-shaped or tubular, each defining, together with an adjacent element 16', 16" parallel therewith, near the side walls of the shopping cart, represented by elements 18', 18", and a horizontal element 20 included in the end wall 10, a through opening 14' and 14" for the insertion of a child's leg.

In connection with these through insertion openings 14' and 14" for a child's legs, there is pivotally suspended from the end wall 10 and a frame 23 movable relatively thereto, see in particular FIG. 1, a known child seat 22, which has an essentially horizontal position in its active position, as shown, and an essentially vertical idle position, not shown, when the frame 23 is pivoted to the end wall 10. The pivotal suspension of this child seat 22 is well known and therefore not shown in detail.

As its upper edge, the end wall 10 is pivotally supported on a horizontal axis (suggested through the longitudinal axis A-A of the transversal rod 21 in FIG. 1), so that it may swing up when shopping carts are being stacked, inserted partially one into the other horizontally, FIG. 2. By the preceding pivoting of the frame 23 towards the end wall 10, the child seat 22 is pivoted into its idle position parallel to the frame 23 and the end wall 10, so that it does not interfere with the stacking.

Centrally in the upper portion of the end wall in question there is arranged, in accordance with the present invention, a child-securing device 24, which shall cooperate, in principle, in an opening-restricting manner with the transversal element 20 of the end wall 10 in order to restrict these through openings 14', 14" after the child has put is legs through the openings, and is safely seated on the seat 22.

The active element 24 of the child-securing device is bar shaped and extends essentially parallel with the end wall of the shopping cart, and has downward end portions 24', 24", each joining the transversal main body at a transition portion rounded convexly upwards/outwards.

The bar-shaped safety element 24 is suspended from the upper portion of the end wall 10, for example from the transversal rod 21.

To the middle rod-shaped/tubular elements 10', 10" of the end wall, the stationary part 28 of the height-adjusting device of the safety element 24 is rigidly secured.

To the top of the frame tubes or similar of the shopping cart, centrally at the end wall, there is attached, in a manner not shown in further detail, a depending narrow oblong plate 26.

This stationary part 28 of the height-adjusting device for the safety element 24 cooperates with the vertically displaceable element of the height-adjusting device, which carries the safety element, and which can be fixed in the set, adjusted height, and has the form of a slide 30 in the shape of a right-angled U, viewed horizontally.

The reference numeral 32 identifies a securing head for the safety element 24, 34 identifying an operating knob arranged in a central hole 32' in the securing head 32.

Figure 4:
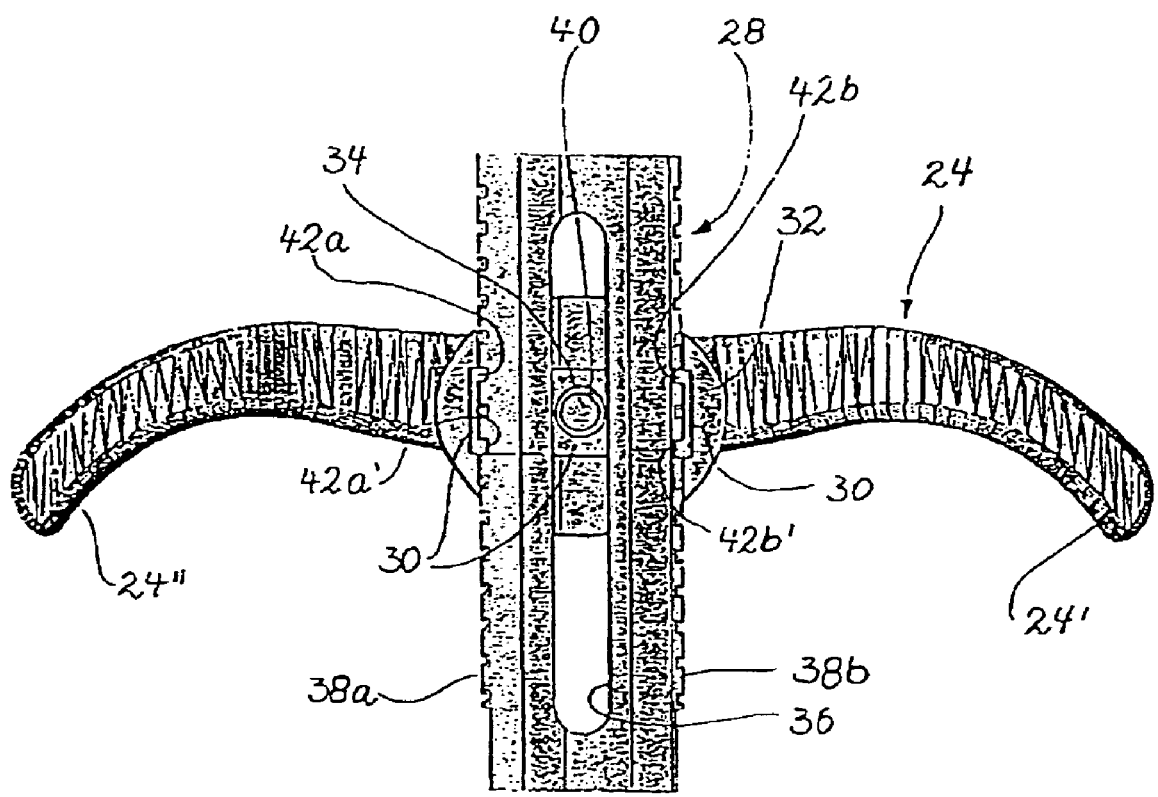
FIG. 4 shows a front view of the safety device separately, the transversal safety element having rounded, downward end portions.

FIG. 4 shows that the stationary part 28 of the height-adjusting device 28, 30 of the safety element has racks 38a, 38b facing in opposite directions. From FIGS. 5, 5a and 6, 6A it appears that each of these racks comprises a pair 38a, 38a' and 38b, 38b' of racks.

The operating knob 34 of the head 32 of the safety element is connected to one end of a compression spring in the form of a helical spring 40 arranged centrally, whose other end is secured centrally in a bowl-shaped slide piece 41 with securing means in the form of two sleeves 41' with internal threads for the reception of screws (not shown), which are screwed into the sleeves 41' through holes 32" in the securing head 32, so that the parts 32 and 41 are immovable perpendicularly to the length of the tubes 10', 10" of the end wall, but can be displaced along said length, so that said bowl-shaped slide piece 41 will form a counter element for the spring 40 by its compression, as a consequence of the pushing in of the operating knob 34.

Figure 5:
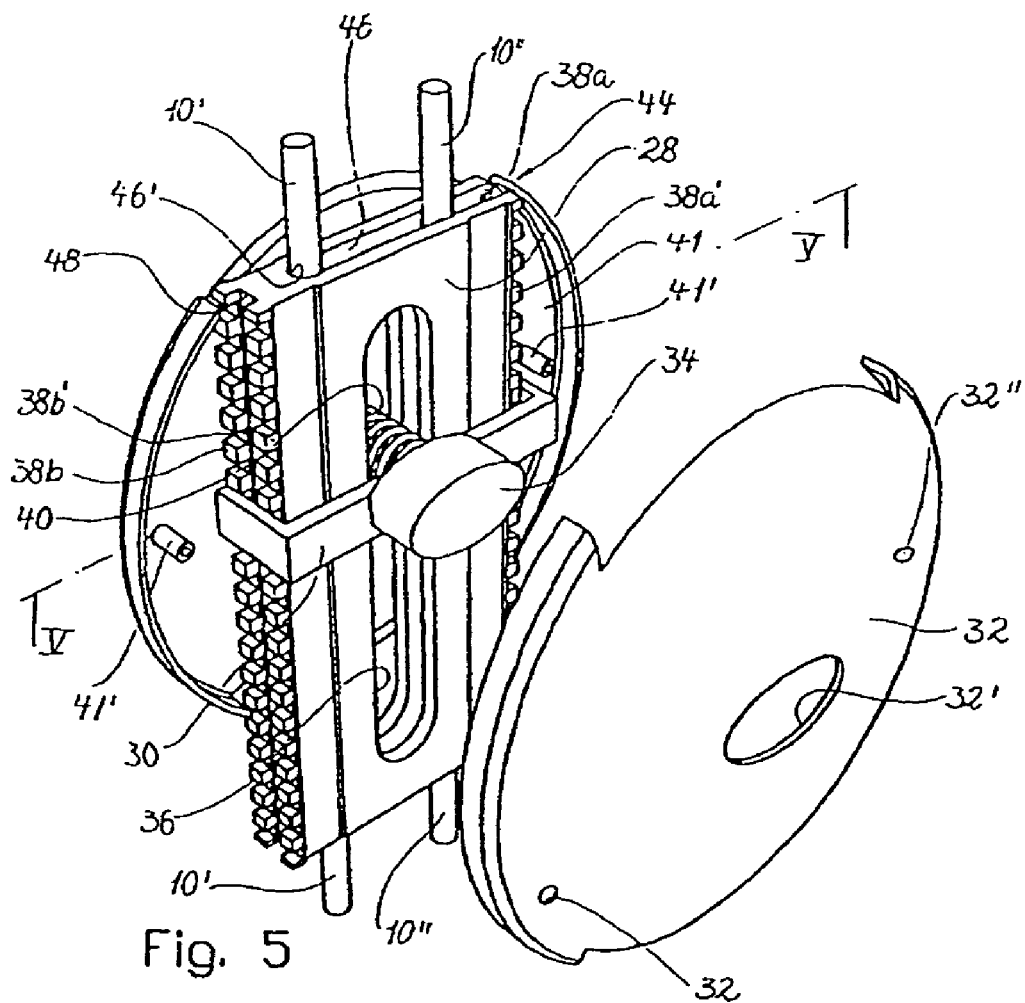
FIGS. 5, 5A and 6, 6A show partial perspective views and illustrate, seen at an angle from above, a simple height-adjusting device for the safety element (not shown), FIG. 5 showing the projections of the slide, carrying the safety element, engaged in stationary vertical racks, which fix the position of the safety element, and have an intermediate guide groove for glidably receiving the projections of the slide carrying the safety element, for the displacement of the safety element heightways.

From FIGS. 4, 5, 5A, 6, 6A it will appear that the slide 30 is provided with four projections 42a, 42a' and 42, 42b', facing each other in pairs, engaging respective notches of the racks 38, 38a', 38b, 38b' in the fixed height position of the safety element 24, FIGS. 4 and 5.

Figure 5A:
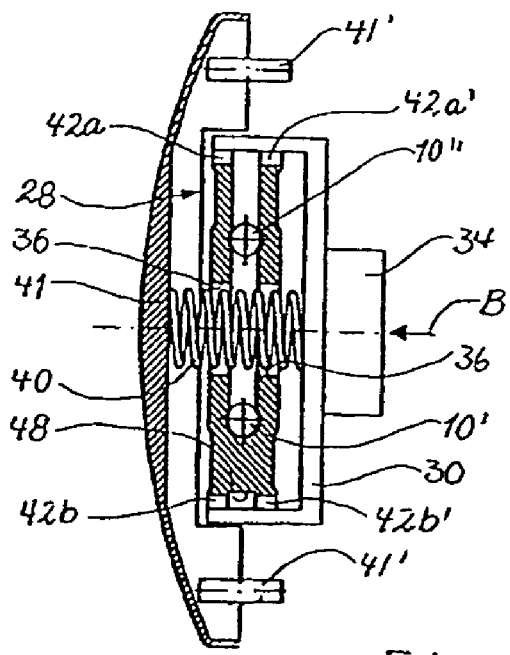
Figure 6:
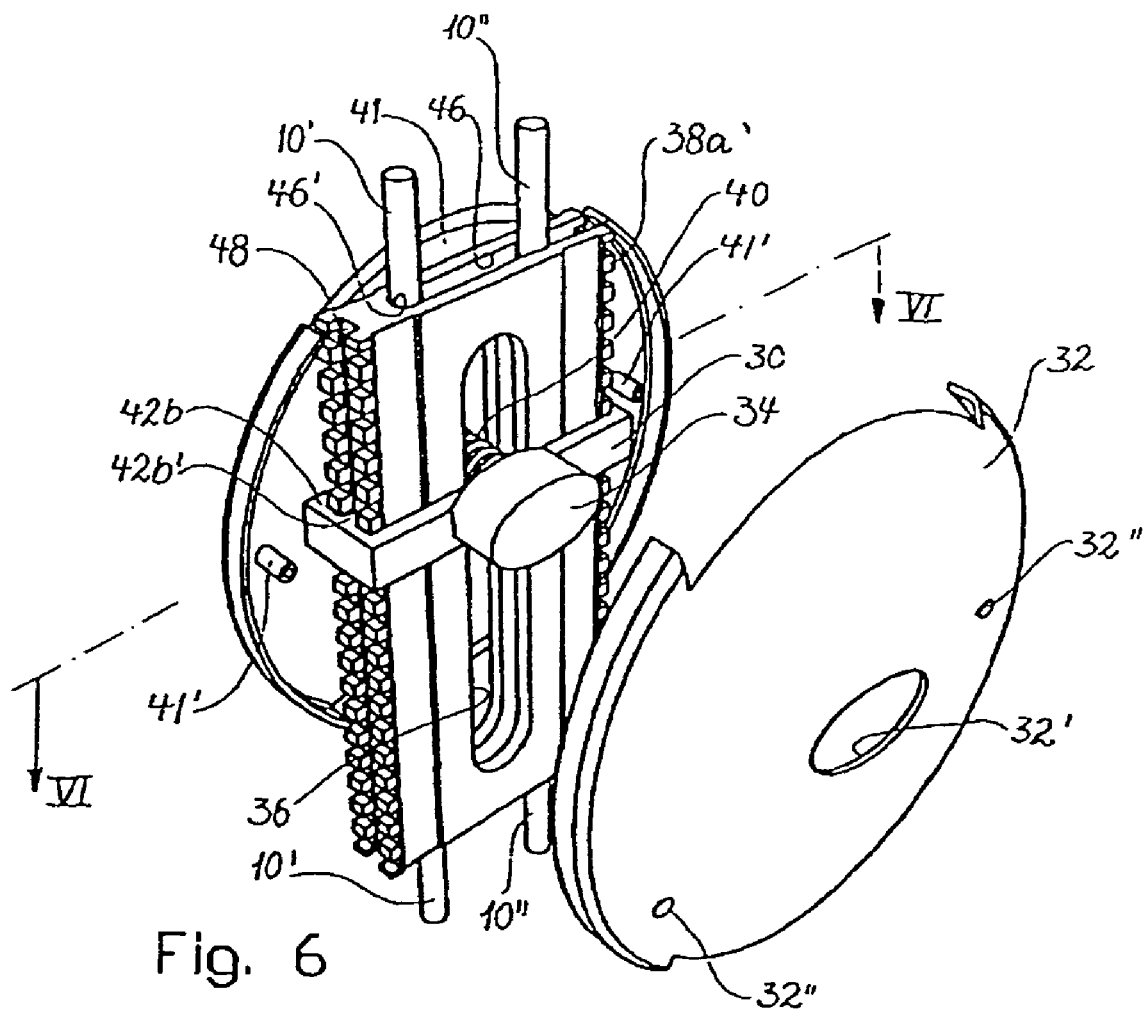
Figure 6A:
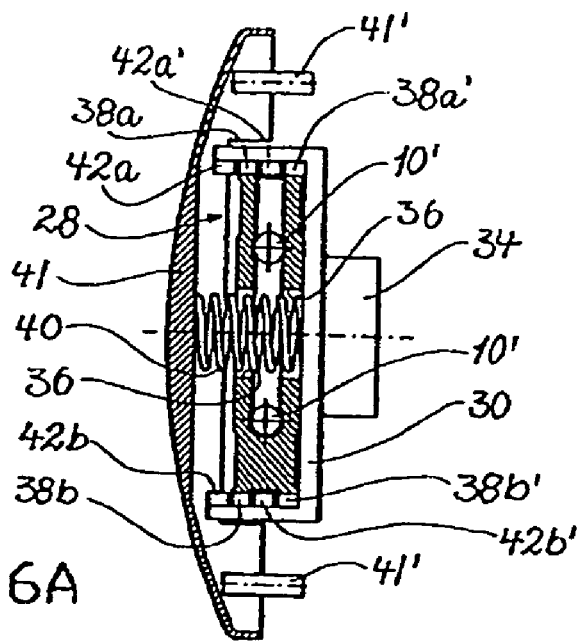

By the pushing in of the operating knob 34 of the safety element 24 in the central hole 32' of the securing head 32 for the compression and tightening of the spring 40, whereby the glide piece 41 of the spring 40 works as a counter element, thereby allowing the compression of the spring 40, the projections 42a, 42a', 42b, 42b' of the slide 30 are brought out of engagement from the notches of the racks 38a, 38a', 38b, 38b', FIGS. 5A, 6 and 6A, whereby the slide piece 41 of the compression spring 40 together with the securing head 32 and the slide 30 can be displaced heightways up or down.

The push-in direction of the operating knob 34 is suggested by B in FIG. 5A. The push-in depth essentially corresponds to the width of one tooth or a projection 42a, 42a', 42b, 42b', which appears from FIGS. 5A and 6A seen together.

According to FIGS. 5 and 6, the part 28 of the height-adjusting and fixing device 28, 30 of the safety element 24, which is stationary in the connected position of use, is formed like a U-clamp, i.e. with an elongate cross-section squeezed flat horizontally, which has an insertion opening 44 between the vertical racks 38a, 38a', from where a slot 46 extends vertically through and across most of the horizontal dimension of the part 28, ending in a rounded inner portion 46'. such a part 28, shaped like a U-clamp, may be slipped over/clamped onto the two middle rod-shaped or tubular elements 10', 10" of the shopping cart end wall 10, and be secured thereto.

Between the racks 38b and 38b' of the pair 38b, 38' of the racks, there is formed a vertical guide groove 48 for one projection 42b' of the slide 30, whereas the second projection 42b slides, bearing externally on the rack 38b, when the slide 30 with the safety element 24 is displaced up or down, and the spring 40 is compressed. In their secured position in the position of use, the racks 38a and 38a' of the pair 38a, 38a' of racks will enclose a corresponding vertical guide groove formed by the insertion opening 44.

The safety element 24 shaped like a clothes hanger with two arms 24', 24" of a downward concave shape, will essentially come t bear lightly on the child's thighs, so that the child cannot get up when the safety element 24 has been set in the correct position heightways.

FIG. 2 shows three shopping carts pushed partially into one another, provided with safety elements 24 which are pivoted together with the end wall 10 when this is influenced by another cart being pushed in.

The invention is not limited to the particular-height adjusting/fixing device shown for the safety bar 24, as other interlockable/releasable, displaceable or telescopic devices may be used, wherein the securing of the individual positions can be stepped or infinitely variable. A safety bar 24, with a spring or a telescopic cylinder arranged thereto, exerting a constant light pressure across the child's thighs, can also be used. A number of alternative embodiments are illustrated in FIGS. 7-13.

Figure 7:
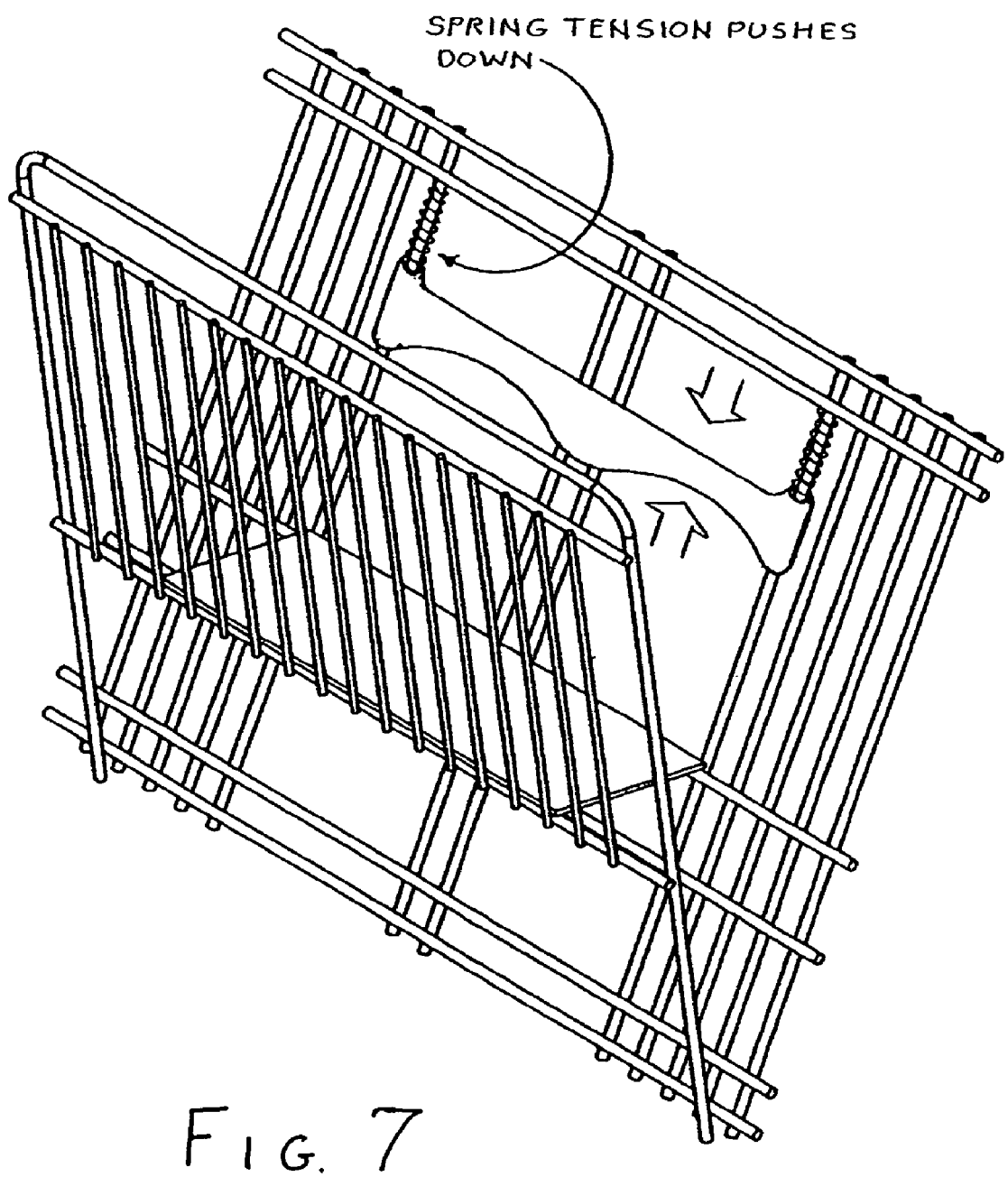
FIG. 7 is another embodiment of a safety bar according to the present invention.
Figure 8:
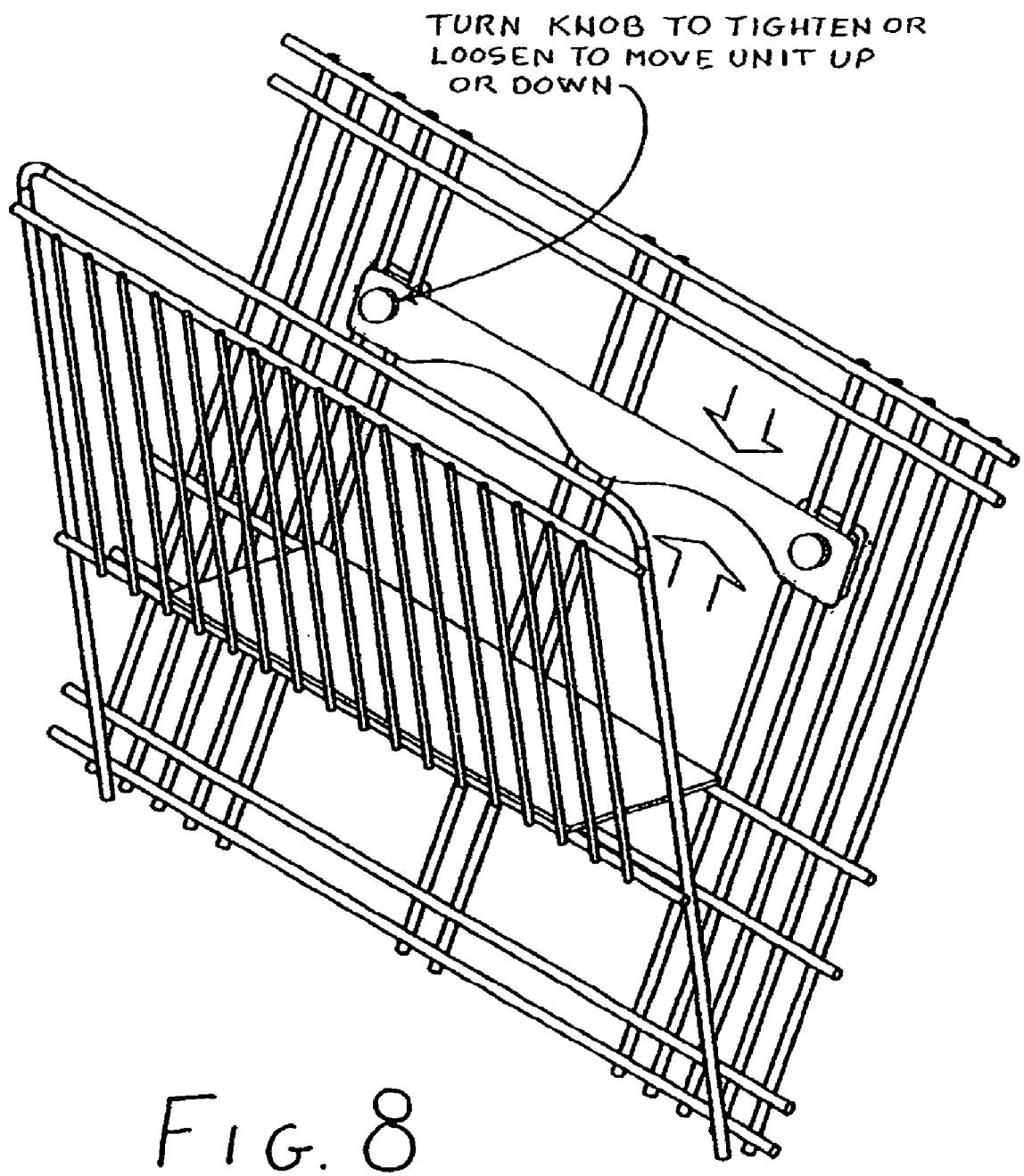
FIG. 8 is another embodiment of a safety bar according to the present invention.
Figure 9:
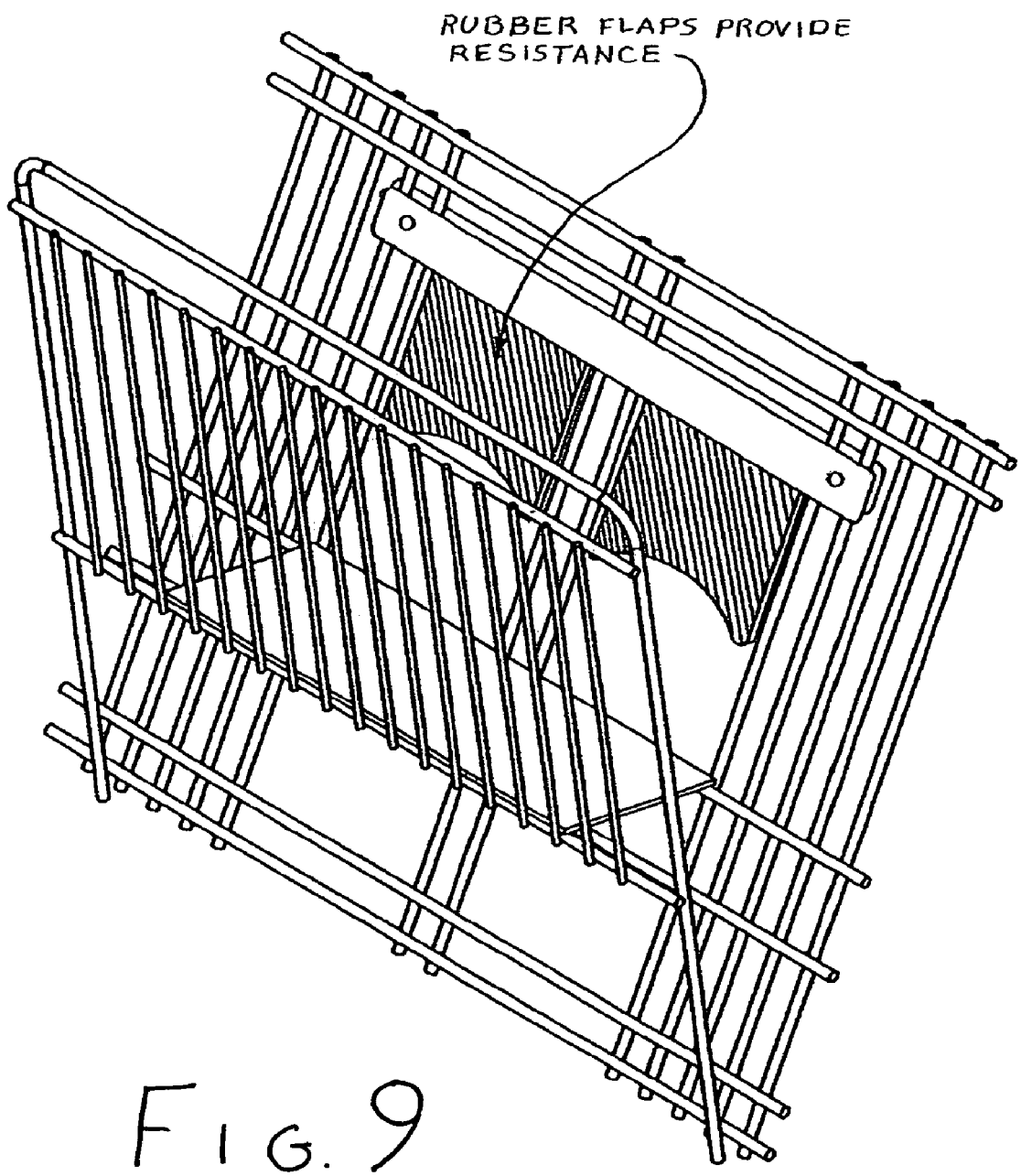
FIG. 9 is another embodiment of a safety bar according to the present invention.
Figure 10:
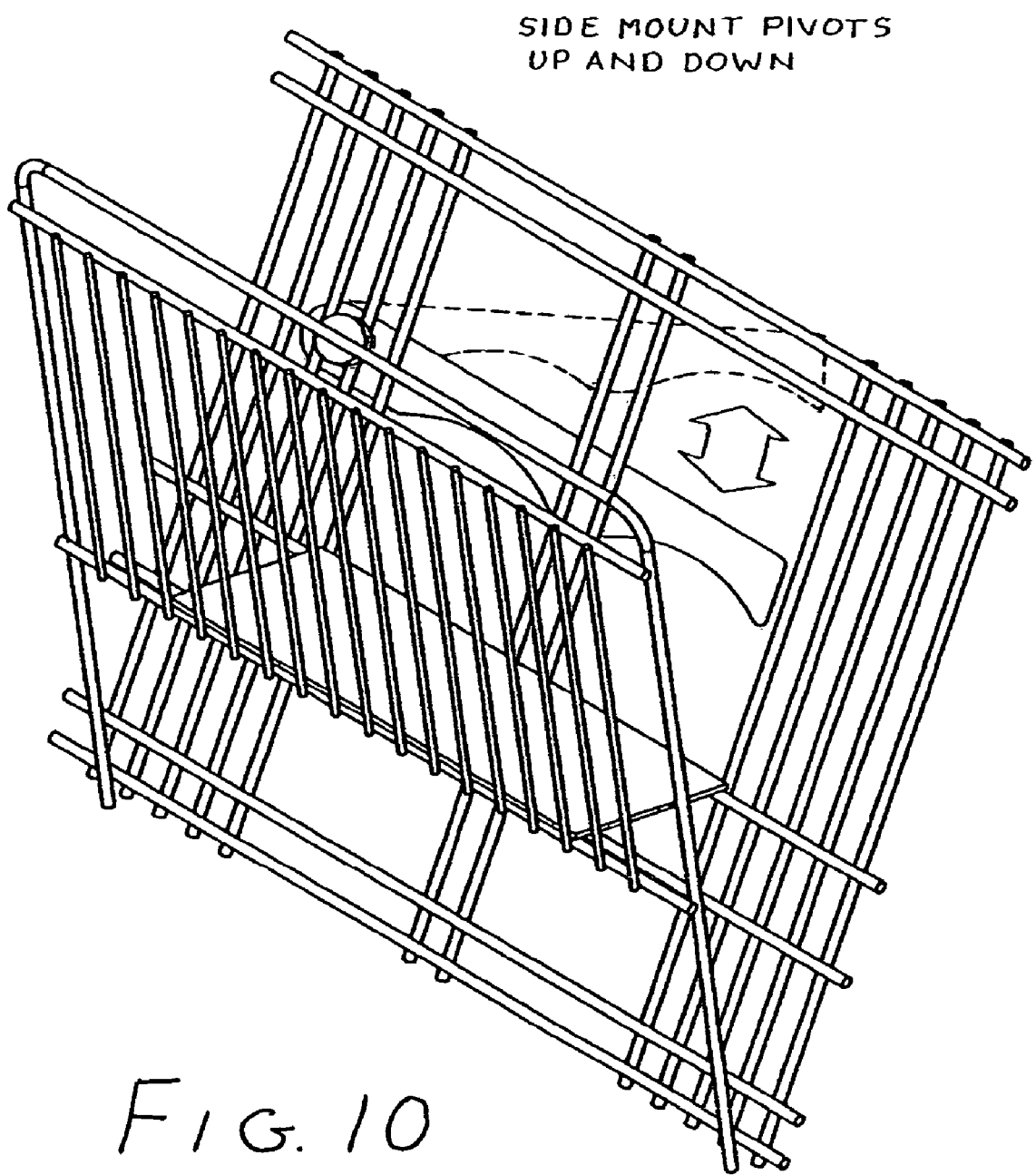
FIG. 10 is another embodiment of a safety bar according to the present invention.
Figure 11:
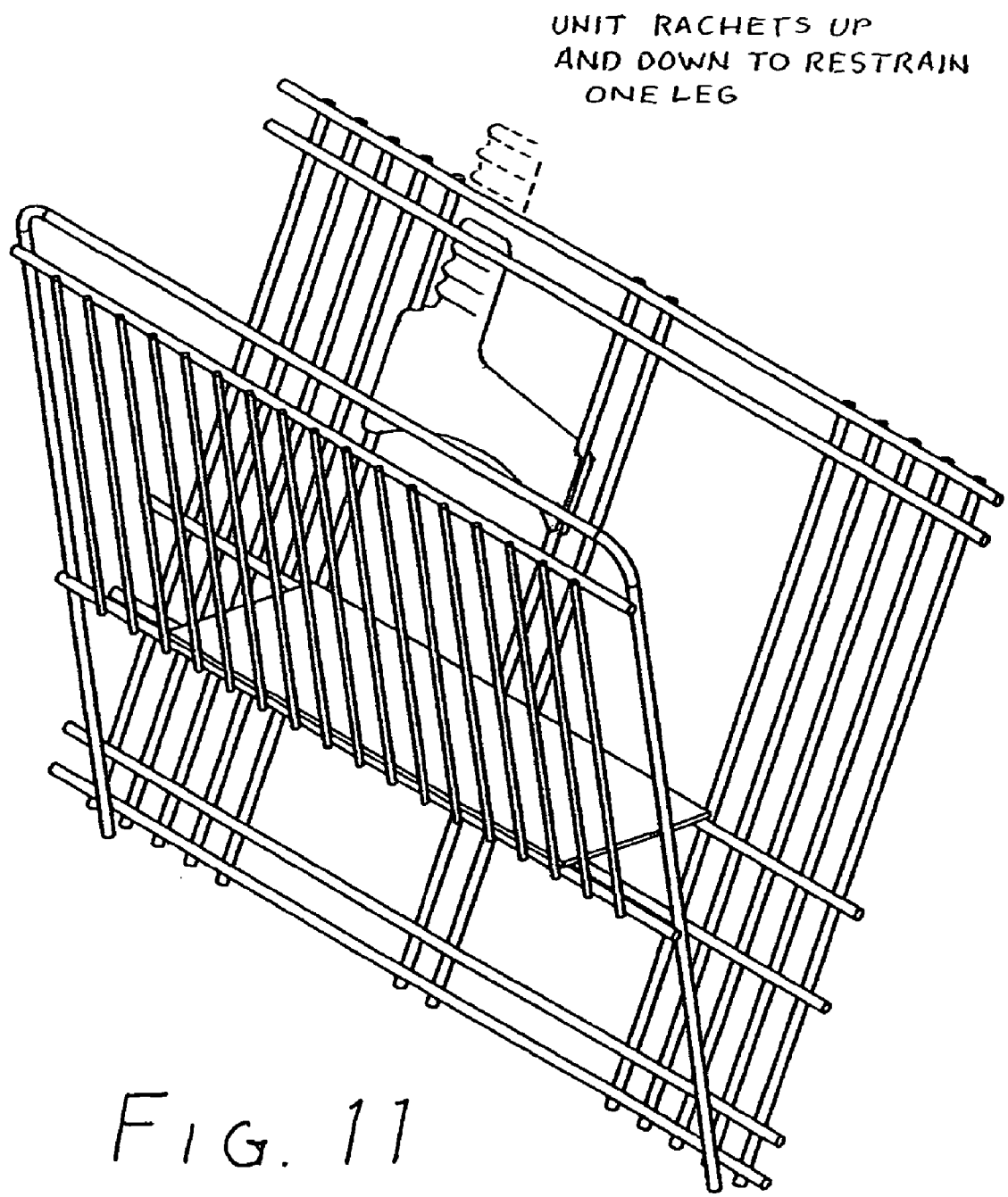
FIG. 11 is another embodiment of a safety bar according to the present invention.
Figure 12:
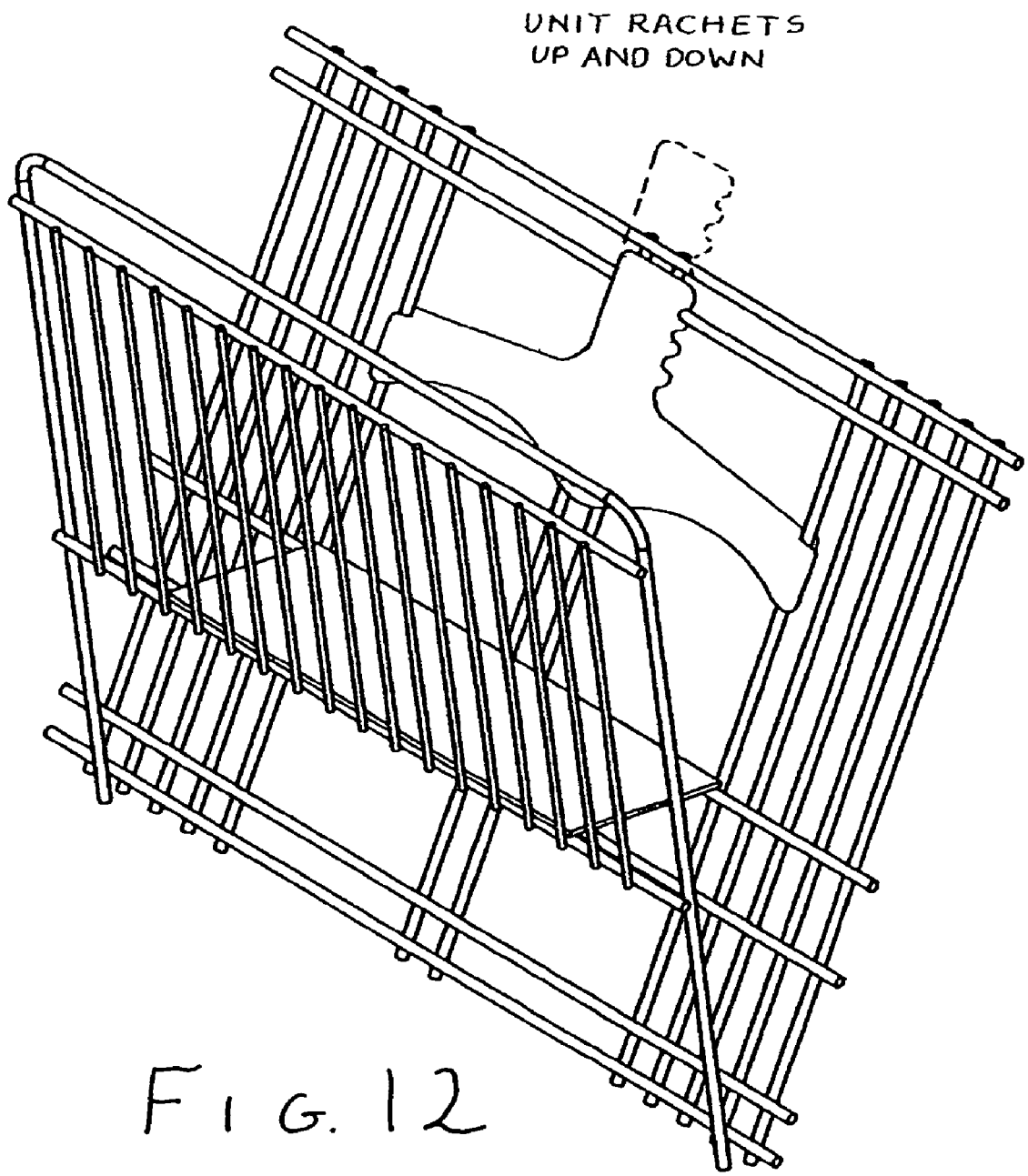
FIG. 12 is another embodiment of a safety bar according to the present invention.
Figure 13:
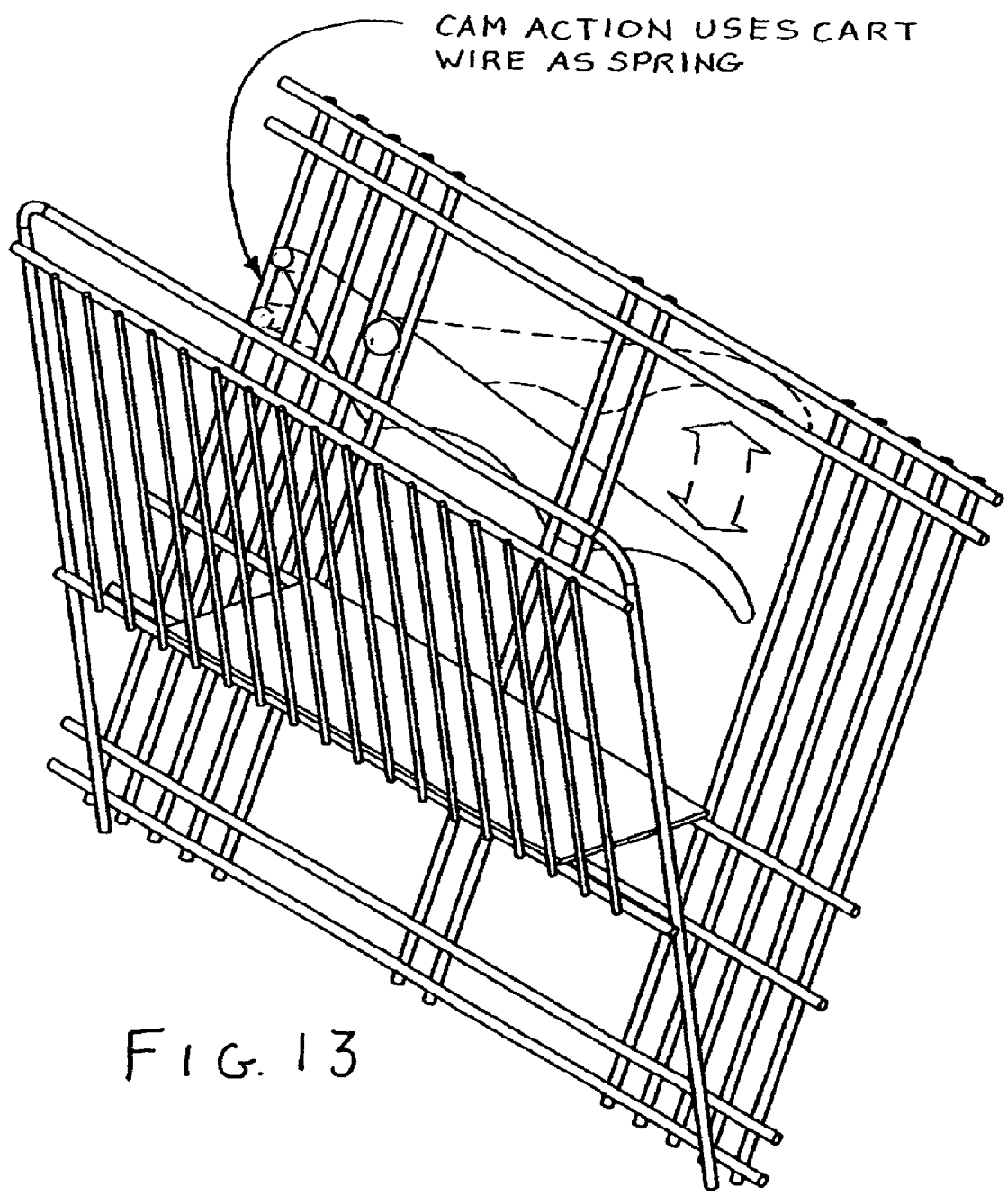
FIG. 13 is another embodiment of a safety bar according to the present invention.
Figure 14:
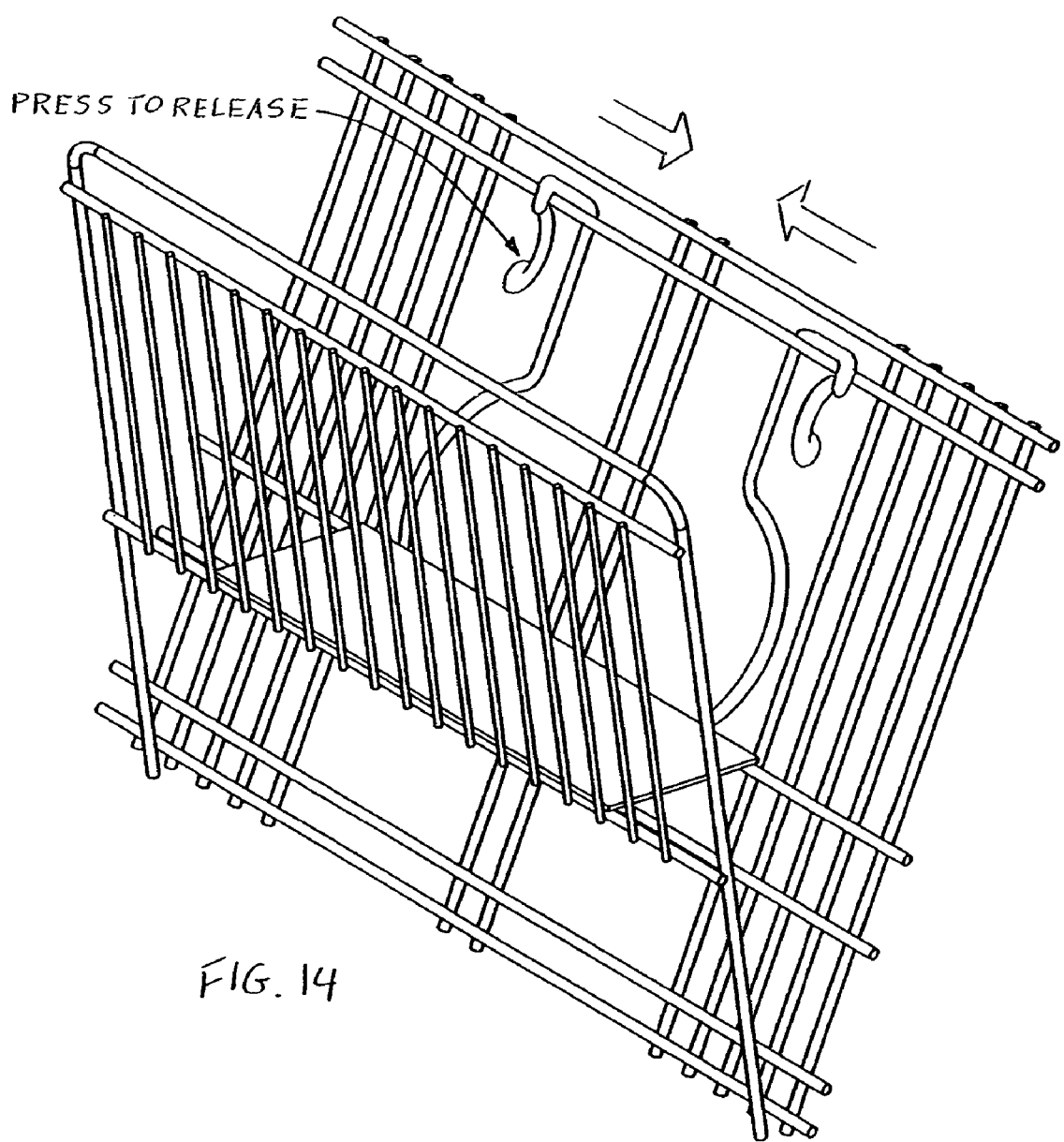
FIG. 14 is another embodiment of a safety element according to the present invention.

In FIGS. 7-9 and 11-12, the safety device slides up and down to secure the child in the shopping cart. In FIGS. 10 and 13, the device pivots to secure the child. In FIG. 14, the safety device moves laterally with respect to the leg openings. In each of the embodiments in FIGS. 7-14, additional concepts for restricting a leg opening in a shopping cart seat are illustrated. For example, FIG. 7 illustrates a biased slide that is lifted to permit a child's legs to be put through the leg openings, and then released to apply a slight bias to the child's legs through springs coupled to the cross-bar device. Alternately, or in addition, the cross-bar device may be fixed in a particular location with a spring bias. For example, the springs coupled to the cross-bar device may bias the cross-bar device to a position in which the cross-bar device is secured, as through a releasable latch. FIG. 8 illustrates the concept of a slidably adjustable leg opening restriction device that is adjusted with a friction lock on the wire frame of the shopping cart. FIG. 9 illustrates the concept of the use of a dampening or restrictive material to restrict a leg opening for a child. As the child's legs are placed through the opening, the restrictive material is biased against the child's legs to contribute to keeping them within the leg openings. FIGS. 11 and 12 show other slidably restrictive configurations, the drawing in FIG. 11 illustrating a one leg opening restriction, while the drawing in FIG. 12 illustrates a two leg opening restriction. Referring to FIGS. 10 and 13, a pivotable leg opening restriction device is illustrated for a wire frame shopping cart. After the child's legs are placed through the leg openings, the restriction device is actuated to restrict the leg opening, and potentially contact the child's legs to prevent the child from removing their legs from the leg openings.

Referring to FIG. 14, a leg opening restriction device that moves laterally with regard to the shopping cart is illustrated. In the embodiment illustrated in FIG. 14, the leg opening restriction device restricts the opening from the sides, rather than from a top or bottom. It should be apparent that the concept of restricting the leg opening is not limited to the examples provided above, but may be realized according to a number of different designs, each of which is contemplated to be within the scope of the present invention. Any type of device that is suitable for restricting the leg opening, or restricting movement of a child's leg in a shopping cart seat or other type of child seat is contemplated as being within the scope of the present inventions.

Figure 15:
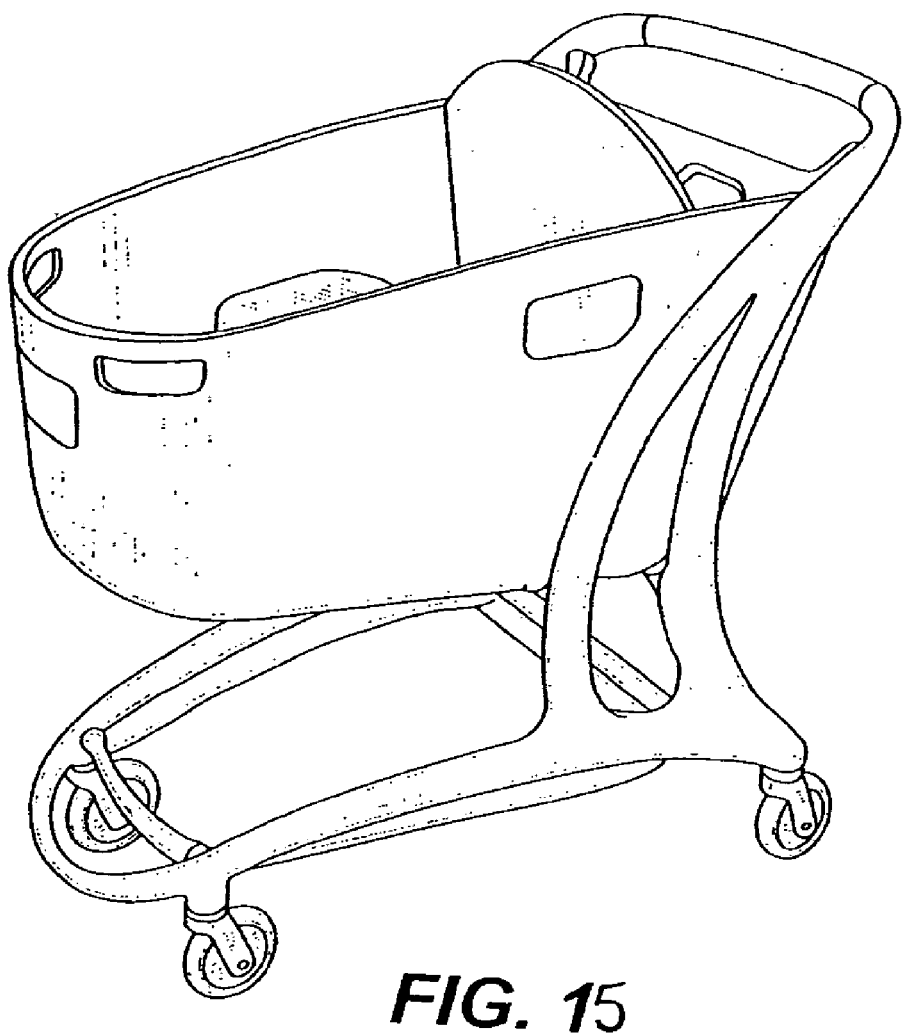
FIG. 15 is a perspective view of a molded shopping cart with leg openings separated by a rigid frame member.
Figure 16:
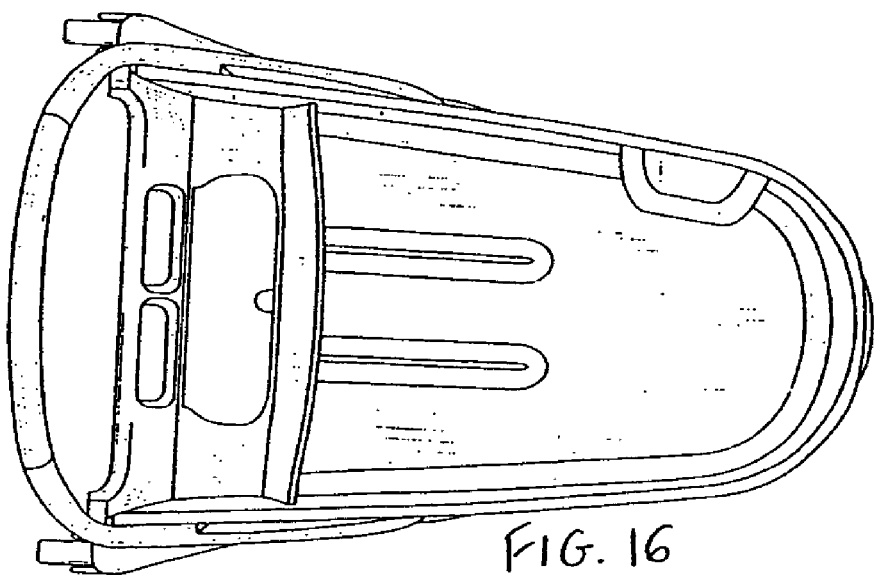
FIG. 16 is a top view of the shopping cart of FIG. 15.

Referring now to FIGS. 15 and 16, a molded shopping cart with molded leg openings is illustrated. The leg openings take the form of two oval-shaped openings in a rear side wall of the shopping cart. In accordance with the present invention, a leg opening restrictive device may be coupled to the shopping cart seat to restrict the leg openings according to any particular design illustrated above, or in general to accomplish the goal of restricting the leg opening or restricting movement of a child's leg placed through the leg openings. Accordingly, a leg restriction opening may be attached to the shopping cart in the area of the leg openings to be manipulated to restrict the leg openings after the insertion of a child's legs. It should be apparent that the present invention may be used on any type of shopping cart, whether formed of molded plastic or wire mesh, or any other type, and such realizations are contemplated as being within the scope of the present invention. In addition, the present invention is suitable for use in any type of seat where restriction of leg movement is desired. For example, child seats in strollers or high chairs may benefit from the present invention. Furthermore, seats such as those used in amusement park rides may also use the present invention to restrict leg movement to contribute to securing an occupant in a seat.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A restraint device for restraining a child occupant of a shopping cart seat having a seat surface with a front edge, above which front edge can be accommodated the child occupant's legs, and having an upright back support adjacent a rear extent of the seat surface, the device comprising:
   an adjustable restraint member being located above and closer to the front edge of the shopping cart seat than to the back support and movably positionable in a vertical direction toward and away from the front edge for changing a dimension of an area above the front edge;
   a support for supporting the restraint member and having a portion being non-adjustably positioned closer to the front edge of the shopping cart seat than to the back support and in a center region of the shopping cart seat such that the support portion extends between the legs of the child occupant, the restraint member being moveably coupled to the portion to permit movement in the vertical direction along the portion; and
   the restraint member having a retaining element for retaining the restraint member in a plurality of positions in the vertical direction on the portion, wherein the restraint member reduces the dimension of the area above the front edge to restrict movement of the legs of the child occupant in one or more of the positions.

2. The restraint device according to claim 1, wherein the adjustable restraint member further comprises a vertical slide.

3. A method for restraining a child in a shopping cart comprising applying the device of claim 1.

4. A method for restraining a child in a shopping cart seat of a nestable shopping cart, comprising:
   providing an adjustable restraint device above a front edge of the shopping cart seat being adjacent to an area suitable for receiving a leg of the child and moveably coupled to and supported by a non-adjustable central divider extending between the child's legs, the device being operable to provide a variable dimensional range of the area by positioning the adjustable restraint device in a vertical direction along the central divider;
   vertically positioning the adjustable restraint device along the central divider to define a first dimensional relationship in the area suitable for a degree of free movement of the leg of the child; and
   vertically positioning the adjustable restraint device along the central divider to define a second dimensional relationship in the area different from the first dimensional relationship and suitable for reducing the degree of free movement of the leg of the child when the adjustable restraint device defines the second dimensional relationship.

5. The method according to claim 4, further comprising operating the device over a range of dimensional relationships.

6. The method according to claim 5, further comprising:
   sliding the adjustable restraint device in the vertical direction to modify the dimensional range of the area; and
   releasably securing the device in a selected position.

7. The method according to claim 4, further comprising:
   providing a cross bar member on the adjustable restraint device; and
   obtaining the dimensional relationship relative to the cross bar member.

8. The method according to claim 4, further comprising positioning the adjustable restraint device in the vertical direction to define at least a third dimensional relationship in the area being different from the first and second dimensional relationships.

9. The method according to claim 4, further comprising retaining the adjustable restraint device in a position along the central divider that defines one of the first or second dimensional relationships.

10. The method according to claim 4, further comprising:
    including a flexible material on the device to contribute to defining one of the first or second dimensional relationships; and
    displacing the flexible material to change a dimensional relationship in the area when the seat is occupied.

11. The method according to claim 4, further comprising pivoting the device to obtain the first or second dimensional relationship.

12. The method according to claim 4, further comprising biasing the device in the first or second dimensional relationship.

13. A child restraint device for restraining a child in a seat, comprising:
    a positioning member arranged to be between the child's legs in a non-adjustable fixed location relative to the seat for positioning portions of the device over a range of locations in a vertical direction;
    a restraining extension coupled to the positioning member and positionable in the vertical direction along the positioning member over the range to define a restraint area of variable dimension in relation to the seat;
    a biasing mechanism cooperative with the restraining extension to contribute to maintaining the restraining extension in any one of a plurality of positions in the range; and
    one or more of the positions of the restraining extension causing the restraint area to have a relatively reduced dimension, whereby the child in the seat is restrained.

14. The device according to claim 13, wherein the biasing mechanism includes a resilient member to bias the restraining extension toward the any one of the plurality of positions.

15. The device according to claim 14, wherein the resilient member is a spring.

16. The device according to claim 14, wherein the resilient member is a flap of resilient material.

17. The device according to claim 13, wherein the positioning mechanism includes a friction lock member operative to contribute to maintaining the any one of the plurality of positions.

18. The device according to claim 13, wherein the biasing mechanism includes a plurality of detents for contributing to maintaining the any one of the plurality of positions.

19. A shopping cart child seat restraint, comprising the device according to claim 13.

20. A method for restraining a child in a shopping cart seat of a nestable shopping cart, comprising:
    providing a device moveably coupled to and supported by a central divider extending between the child's legs, the device being moveable in a vertical direction along the central divider to vary a dimension of an area in the seat that receives a leg of the child;
    vertically adjusting the device along the central divider to provide a larger dimension for the area for receiving the leg of the child; and
    vertically adjusting the device along the central divider to have a smaller dimension for the area for restraining the leg of the child when the child is in the shopping cart seat.

21. The method according to claim 20, further comprising movably positioning the device along the central divider in a region proximate to the leg area.

22. A method for restraining a child in a shopping cart seat of a nestable shopping cart, the seat having a back wall and a front wall, the front wall having at least one through opening that is formed as a closed loop for receiving a single leg of a child occupant, the method comprising variably restricting a size of the leg hole opening for receiving the leg of the child.

23. A method for restraining a child in a shopping cart seat of a nestable shopping cart, comprising:
receiving a single leg of a child in a leg restriction device defining a single leg opening formed as a closed loop; and
modifying a dimensional area of the single leg opening defined by the device to increase a restraint on the single leg of the child.

24. The method according to claim 23, further comprising forming a part of the device with a flexible material that contributes to modifying the dimensional area to increase the restraint on the single leg of the child.

25. A child seat restraint device for use with a child seat having a rear back support and a front edge above which can be received of a child's legs, comprising:

a support member for supporting a portion of the device and located at the front edge such that the support member is between the legs of the child when the child occupies the child seat;

a cross member coupled to the support member and being movable in a vertical direction along the support member;

the cross member having a positioning element to permit the cross member to be retained over the legs of the child in a plurality of positions in the vertical direction on the support member to obtain a variable range of permitted movement for the legs of the child; and one or more of the positions being operable to reduce the range of movement for the legs of the child, whereby the child is restrained when the legs of the child are above the front edge and the cross member is in the one or more positions.

* * * * *

UNITED STATES PATENT AND TRADEMARK OFFICE
CERTIFICATE OF CORRECTION

| | |
|---|---|
| PATENT NO. | : 7,887,067 B2 |
| APPLICATION NO. | : 11/017418 |
| DATED | : February 15, 2011 |
| INVENTOR(S) | : Dag Harald Sandvik et al. |

It is certified that error appears in the above-identified patent and that said Letters Patent is hereby corrected as shown below:

In the Claims

Column 9, claim 25, line 21, delete the word "of".

Signed and Sealed this
Twenty-ninth Day of July, 2014

Michelle K. Lee
*Deputy Director of the United States Patent and Trademark Office*